July 8, 1947.  E. H. LAND ET AL  2,423,503
COMPOSITE PLASTIC SHEET COMPRISING A MOLECULARLY ORIENTED
POLYVINYL ALCOHOL LAYER AND METHOD OF MANUFACTURE
Filed May 22, 1942
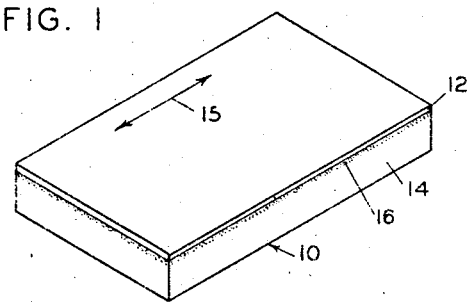
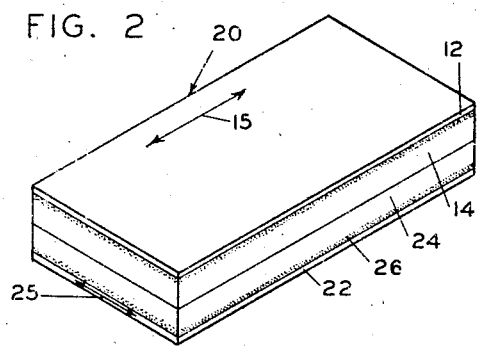
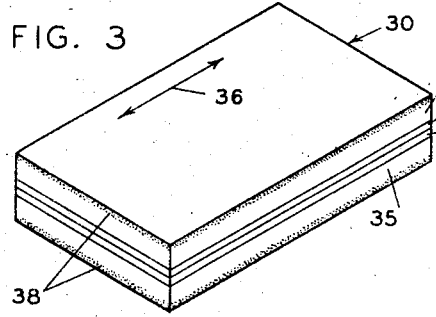
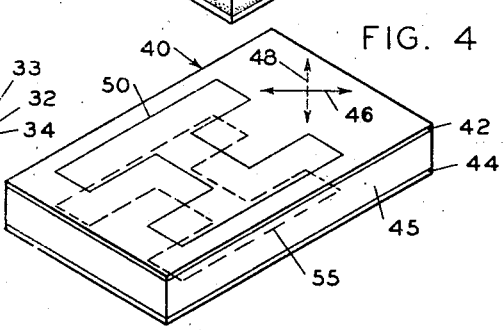
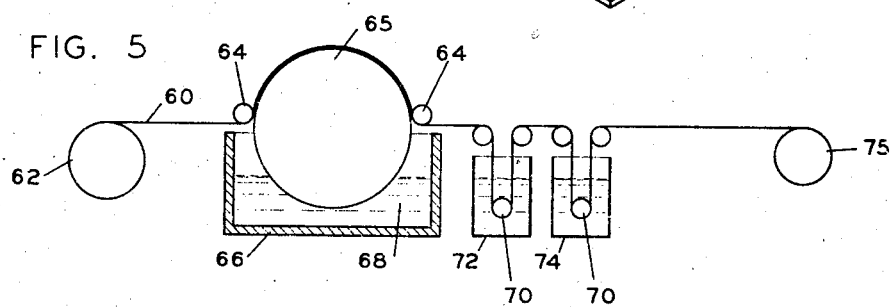
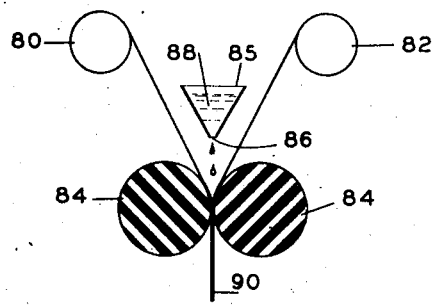
Edwin H. Land,
Joseph Mahler and
William H. Ryan
INVENTORS
BY Donald L. Brown
Attorney Patented July 8, 1947

2,423,503

UNITED STATES PATENT OFFICE 2,423,503

COMPOSITE PLASTIC SHEET COMPRISING A MOLECULARLY ORIENTED POLYVINYL ALCOHOL LAYER AND METHOD OF MANUFACTURE

Edwin H. Land, Cambridge, Joseph Mahler, Brookline, and William H. Ryan, Cambridge, Mass., assignors to Polaroid Corporation, Cambridge, Mass., a corporation of Delaware Application May 22, 1942, Serial No. 444,142

14 Claims. (Cl. 88—65)

This invention relates to a composite plastic sheet or film particularly adapted for use in the production of light-polarizing material and stereoscopic images comprising light-polarizing material, and to methods of making said sheet or film.

An object of the invention is to provide such a composite sheet or film wherein one layer comprises molecularly oriented polyvinyl alcohol and the layer to which it is bonded comprises transparent, substantially non-hydrophilic plastic material having its molecules in their normal condition of heterogeneous disorientation, and particularly wherein the direction of molecular orientation in said first named layer is at a predetermined angle to an edge of said sheet.

Further objects are to provide a composite sheet or film of the above type wherein the second named layer also comprises polyvinyl alcohol, wherein the second named layer comprises cellulosic material such as cellulose acetate or cellulose acetate butyrate, and particularly wherein the second named layer comprises cellulose acetate or similar material having one surface thereof converted to regenerated cellulose and wherein said molecularly oriented polyvinyl alcohol layer is bonded to said converted surface.

A still further object is to provide a composite sheet or film comprising two layers of polyvinyl alcohol bonded to a central layer of a transparent plastic material of different physical properties, and particularly wherein the central layer comprises non-hydrophilic material such as cellulose acetate, and wherein the outer layers comprise molecularly oriented polyvinyl alcohol and have their directions of molecular orientation substantially at right angles to each other.

A still further object is to provide a composite sheet of light-polarizing material comprising a layer of polyvinyl alcohol having light-polarizing properties bonded between two sheets of substantially non-hydrophilic plastic, and particularly wherein said outer plastic sheets are provided with optically smooth, hard, outer surfaces.

Other objects and advantages will in part appear and in part be pointed out in the course of the following detailed description of several embodiments of the invention, which are given as non-limiting examples, in connection with the accompanying drawings, in which:

Figure 1 is a diagrammatic view in perspective showing a composite sheet constituting an embodiment of the invention;

Figure 2 is a view similar to Fig. 1 showing a composite sheet constituting another embodiment of the invention;

Figure 3 is a view similar to Figs. 1 and 2 showing a composite sheet constituting still another embodiment of the invention;

Figure 4 is a diagrammatic view in perspective showing a sheet similar to the type shown in Fig. 2, having a pair of dichroic stereoscopic images formed therein;

Figure 5 shows diagrammatically apparatus suitable for use in carrying out some steps of the process of the invention; and Figure 6 shows diagrammatically apparatus suitable for carrying out another step of the process of the invention.

It has recently been discovered that dichroic light polarizers and dichroic images may be formed by applying a dichroic dye or stain to the surface of a sheet of suitably molecularly oriented transparent plastic such as polyvinyl alcohol. Similarly, dichroic stereoscopic images may be produced by forming each image by applying a dichroic dye or stain to a separate molecularly oriented sheet of polyvinyl alcohol and then superimposing the two sheets with their directions of molecular orientation at right angles to each other. Alternatively there may first be provided a sheet of plastic material whose outer surfaces comprise polyvinyl alcohol molecularly oriented in the proper directions, and the images may then be superimposed by printing one on one surface of the sheet and the other on the other surface. Preferred results are obtained if the molecular orientation be brought about by stretching the sheet to two or more times its original length before applying the dichroic stain thereto, but difficulty has been encountered with such sheets by reason of the fact that they tend to shrink after stretching, which results in curling and other undesirable effects.

In accordance with the present invention, it has been discovered that greatly improved results are obtained if the sheet of molecularly oriented polyvinyl alcohol is laminated to a second sheet of a transparent plastic of different physical properties. For example, in Fig. 1, layer 12 of composite sheet 10 may comprise molecularly oriented polyvinyl alcohol laminated to a layer 14 comprising cellulose acetate. As another example, layer 12 may comprise polyvinyl alcohol which has been stretched, for example, in the direction indicated by arrow 15, and then laminated to another layer 14 of polyvinyl alcohol which has not been stretched and hence is in its normal condition of heterogeneous molecular orientation.

In this embodiment of the invention, layer 14 will preferably first have been subjected to a baking operation in order to render it relatively moisture-free and moisture-impervious.

In the preferred embodiment of the invention, if layer 12 comprises stretched polyvinyl alcohol, layer 14 will comprise unoriented or otherwise differently oriented material which is substantially less hydrophilic than polyvinyl alcohol, for example cellulose acetate, cellulose acetate butyrate, polyvinyl acetal, or the like. As is indicated in Fig. 1, stretched layer 12 will be relatively thin, for example .0005 inch in thickness, and layer 14 will preferably be substantially thicker, for example .005 inch. It is to be understood, however, that these relative dimensions are given merely as illustrative for a suitable combination, and the invention is not to be construed as in any way limited thereto.

Considerable difficulty has been encountered heretofore in obtaining a satisfactory bond between a hydrophilic material such as polyvinyl alcohol and a non-hydrophilic material, and one object of the present invention is to provide a method for effecting such a bond. In accordance therewith, it has been discovered that a satisfactory permanent bond may be obtained if a layer on the surface of the sheet of non-hydrophilic material is first at least partially converted to hydrophilic material, as is indicated by the stippling at 16 in Fig. 1. This may be done, for example in the case of cellulose acetate, by treating the surface of a sheet of cellulose acetate with a suitable hydrolyzing or deacetylating agent, such for example as sodium hydroxide, which will convert the surface of said sheet to regenerated cellulose. A sheet of polyvinyl alcohol may then be readily bonded to the converted surface of the cellulose acetate by means either of water or a water solution of polyvinyl alcohol.

The invention is in no way limited to the use in layer 14 of the specific materials mentioned above. On the contrary, any similar material may be used which will bond to polyvinyl alcohol or which may have its surface converted to hydrophilic material to which polyvinyl alcohol will more readily bond. Examples of such suitable materials include other cellulose esters such as cellulose nitrate, ethyl cellulose, derivatives of polyvinyl alcohol such as the acetals and ketals and organic acid esters of polyvinyl alcohol, and polymerized esters of acrylic and methacrylic acid and their derivatives.

Particularly satisfactory results for the purposes of the invention may be obtained with a sheet of polyvinyl acetal which has one surface at least partially converted to polyvinyl alcohol by means of a suitable hydrolyzing agent such as a dilute solution of a mineral acid such as sulphuric acid or hydrochloric acid. Many similarly useful materials and modifications will doubtless be apparent to those skilled in the art and are to be understood as coming within the scope of the invention.

Figure 2 shows another embodiment of the invention which is particularly adapted for the reception of stereoscopic prints formed therein by means of a suitable dichroic dye or stain. In Fig. 2 it is assumed that composite sheet 20 has been formed by laminating to the composite sheet shown in Fig. 1 a second similar composite sheet comprising a layer 22 of polyvinyl alcohol and a layer 24 of nonhydrophilic plastic material having a surface at least partially regenerated in the manner described above, as is indicated by stippling 26. If layers 14 and 24 comprise polyvinyl alcohol they may be laminated together by means of either water or polyvinyl alcohol solution, and if they comprise cellulose acetate or like material they may be laminated conveniently by means of acetone or a similar solvent. In Fig. 2 it is assumed that layer 22 has been stretched in the direction indicated by arrows 25, that is to say, the two composite sheets are so put together that the direction of stretch in layer 22 is at right angles to the direction of stretch in layer 12. Accordingly if stereoscopic images are formed in sheet 20 by means of dichroic dyes, the image formed in layer 12 will have its polarizing axis at right angles to the image formed in layer 22. This will be explained in greater detail hereinafter in connection with Fig. 4.

It is not essential for purposes of the invention that sheet 20 shown in Fig. 2 have two central layers 14 and 24, or that the molecular orientation of layers 12 and 22 take place before each is laminated to its supporting sheet. It is within the scope of the invention to form sheet 20 by laminating sheets 12 and 22 to a single central layer of polyvinyl alcohol, cellulose acetate or similar transparent plastic material of different physical properties. The desired angular relationship between the directions of molecular orientation in layers 12 and 22 may be secured by first stretching them and then laminating them to the central layer with their stretch axes crossed. Alternatively sheets 12 and 22 may be laminated to their central supporting layer or layers before orienting the molecules therein, and the molecules may then be oriented in the desired directions by the application of linear frictional force to the outer surfaces of layers 12 and 22 by means, for example, of a suitable scraper element. All such modifications in the process and product of the invention are likewise to be considered as coming within the scope thereof.

Fig. 3 represents diagrammatically a composite light-polarizing sheet 30 constituting another embodiment of the present invention. In sheet 30 central layers 32 and 34 represent polyvinyl alcohol which has been molecularly oriented and treated with a suitable dichroic dye or stain to render it light-polarizing. For example, said sheets may be dyed with iodine in the manner disclosed in Patent No. 2,237,567 or with a plurality of complementary dichroic dyes which in combination produce a neutral polarizer. Layers 33 and 35 represent sheets of non-hydrophilic plastic treated in accordance with the process of the invention and each laminated to its adjacent sheet of polyvinyl alcohol. Sheets 32 and 34 may then be bonded together as by means of polyvinyl alcohol solution to form a composite light-polarizing sheet.

The arrangement of the component layers of sheet 30 in Fig. 3 may be varied in several ways, depending upon the purpose to which the sheet is to be put. If it is to be used as a light polarizer, layers 32 and 34 should be superimposed with their stretch axes substantially parallel, for example in the direction indicated by arrow 36. Alternatively either of layers 32 or 34 may be eliminated, or only one may be rendered light-polarizing. The arrangement first described, however, is preferred because of the convenience which it lends the assembling of the device.

In another modification of the embodiment of the invention shown in Fig. 3, light-polarizing sheets 32 and 34 may be assembled with their stretch axes crossed, in which case the composite sheet will serve as a filter for visible light but will transmit infra-red rays. It may also be desirable to provide sheets 33 and 35 with hard outer surfaces of optical smoothness. This may be accomplished by swelling said surfaces with a polymerizable organic plastic which will polymerize to form a harder material than the body of the sheets, for example a vinyl compound such as methyl methacrylate in combination with sheets of cellulose acetate, and placing the sheet between press-polish plates of glass or other suitable material while the polymerizable compound is caused to polymerize. Sheets 33 and 35 are indicated by stippling 38 as having been subjected to this hardening treatment. Other modifications of this embodiment of the invention will doubtless be apparent to those skilled in the art, and are to be construed as coming within the scope thereof.

Figure 4 shows diagrammatically a composite sheet of the type shown in Fig. 2 having dichroic stereoscopic images formed therein. In Fig. 4 sheet 40 comprises a pair of layers 42 and 44 of molecularly oriented polyvinyl alcohol bonded to a single layer 45 which corresponds to double central layer 14, 24 in Fig. 2. For example, layer 45 may comprise polyvinyl alcohol, or it may comprise cellulose acetate which has both surfaces converted to regenerated cellulose. Alternatively, it may comprise a pair of layers of non-hydrophilic plastic each of which has one surface regenerated to hydrophilic material and which have their unconverted sides bonded together. Layer 42 is represented as having been stretched in the direction indicated by arrow 46, namely 45° to an edge thereof, and layer 44 is represented as having been stretched in the direction indicated by arrow 48, namely at 90° to the direction of stretch of layer 42. This is the preferred angular relation between the directions of stretch in the two sheets, but it is to be understood that the invention is not limited to this arrangement, as is indicated by the relative positions of arrows 15 and 25 in Fig. 2.

In Fig. 4, polyvinyl alcohol layer 42 is represented as having formed thereon an image 50 constituting one image, for example the right-eye image, of a stereoscopic pair. Similarly layer 44 has formed thereon an image 55 representing the left-eye image of a stereoscopic pair. Images 50 and 55 may be formed in layers 42 and 44, respectively, by means of any suitable dichroic dye or stain, such for example as a polyiodide stain or a suitable dichroic direct cotton dye or dyes. When, therefore, sheet 40 is viewed through suitable analyzers, one eye of the observer will see only image 50 and the other eye will see only image 55, and a three-dimensional effect will accordingly be produced. It should be understood that images 50 and 55 may be formed in layers 42 and 44 at any desired time during assembly of the device. However, according to the preferred practice, composite sheet 40 will first be assembled, as explained in connection with Fig. 2, and the images may then be formed thereon, preferably simultaneously, by applying to each surface thereof a colloid relief which has been imbibed in the desired dichroic dye and which bears thereon one of the desired images. It is to be understood, however, that the invention is not limited to the use of the sheet thereof in connection with dichroic images, nor to any particular way of forming the said images thereon.

The surface conversion or regeneration process of the invention may be carried out in various ways, and an example of suitable apparatus for the purpose is shown somewhat diagrammatically in Fig. 5. Plastic sheet or film 60 to be converted is passed from supply roll 62 and guided by means of rollers 64 over drum 65, which dips into tank 66 containing hydrolyzing solution 68. Drum 65 is preferably provided with a surface coating of porous material which is adapted to take up solution 68 but will not be affected thereby, and the size and speed of rotation of said drum may be determined and controlled by the time necessary to regenerate a sufficient amount of material on the surface of sheet 60. This time is in turn dependent upon the temperature and concentration of solution 68.

The extent to which the surface of sheet 60 is converted should be controlled rather carefully. It has been found that preferred results for the purposes of the invention are obtained if the conversion be only partial. In other words, the preferred product of the conversion process of the invention is a sheet of substantially non-hydrophilic material having part of the material on one surface regenerated to hydrophilic material but with the regenerated portions or areas interspersed in substantially mosaic fashion with the unregenerated portions or areas of the material forming the body of the sheet. If this condition is brought about, it will be found that a better bond is obtained when a sheet of hydrophilic material is laminated to the treated surface, for it appears that the unconverted surface material bonds integrally to the converted portions and that the latter in turn bond to the additional sheet. It is to be understood, however, that this condition is merely one which appears preferred, and that the invention is not to be construed as limited thereto.

It will be apparent that control of the conversion process of the invention to bring about the above preferred results depends both upon the materials being treated and upon the hydrolyzing solution being used. Two examples will be given, but it is to be understood that they are given only by way of illustration and that the invention is in no way limited thereto.

If sheet 60 is composed of cellulose acetate, a suitable hydrolyzing agent is a solution of ten parts by weight of sodium hydroxide and twenty parts by weight of water. To this there may be added if desired one part by weight of methanol, and with such a solution a sufficient time of treatment is approximately one minute at room temperature. If sheet 60 is composed of polyvinyl acetal, a suitable hydrolyzing agent is a solution of equal parts of concentrated sulphuric acid and water, and in this case a sufficient time of treatment is approximately ten minutes at room temperature.

When regeneration of a sufficient layer on the surface of sheet 60 is completed, the sheet should be thoroughly washed, and at the same time any of the hydrolyzing solution remaining thereon should be neutralized. Convenient apparatus for this purpose is indicated in Fig. 5 as comprising tanks 72 and 74, through which sheet 60 is guided by means of idler rolls 70. Tank 72 will preferably contain a solution adapted to neutralize the hydrolyzing agent used in tank 66. For example, in the case of cellulose acetate, a satisfactory neutralizing solution will be a 2% solution of sulphuric acid, and in the case of polyvinyl acetal, tank 72 may contain a 5% solution of sodium bicarbonate. Tank 74 will preferably contain water through which sheet 60 may be passed for washing before reaching take-up roll 75. It will be apparent that if desired there may be provided additional washing means and/or suitable drying means such as an oven or ventilating means between tank 74 and roll 75. Such modifications will be apparent to those skilled in the art, and are to be construed as coming within the scope of the invention.

When the sheet of non-hydrophilic material has completed the treatment outlined in connection with Fig. 5, it may be laminated to a sheet of hydrophilic material in the manner indicated diagrammatically in Fig. 6. For example, element 80 in Fig. 6 represents a roll of surface-converted plastic such as cellulose acetate or polyvinyl acetal, and element 82 a roll of polyvinyl alcohol which has preferably already been subjected to the desired stretching operation. The sheets from rolls 80 and 82 are passed between a pair of pressure rolls 84 of rubber or other suitable material, and there may be provided suitable means for applying a laminating solution to the adjacent surfaces of the two sheets just before they pass between rolls 84. As shown in Fig. 6, this may comprise a trough 85 provided with a suitable aperture 86 along its bottom edge and filled with a laminating solution 88 such for example as water or a polyvinyl alcohol solution. Laminated sheet 90 emerging from between rollers 84 may be considered as corresponding to sheet 10 already described and shown in Fig. 1.

It should be expressly understood that the present invention is not limited to the foregoing specific examples or materials, and that the process of the invention is not limited to the purposes set forth above. On the contrary, many other useful applications of the process and products of the invention will be apparent to those skilled in the art, and are to be construed as coming within the scope thereof.

Since certain changes in carrying out the above process, and certain modifications in the article which embody the invention may be made without departing from its scope, it is intended that all matter contained in the above description or shown in the accompanying drawings shall be interpreted as illustrative and not in a limiting sense.

What is claimed is:

1. As a new article of manufacture, a composite plastic sheet comprising a layer of substantially non-hydrophilic transparent plastic, a layer comprising predominantly hydrophilic material integrally formed on one surface of said first named layer by regeneration of the material thereof and a layer comprising molecularly oriented polyvinyl alcohol bonded to said regenerated surface layer.

2. As a new article of manufacture, a composite plastic sheet comprising a layer comprising a cellulose ester, a layer comprising predominantly regenerated cellulose integrally formed on one surface of said cellulose ester layer, and a layer comprising molecularly oriented polyvinyl alcohol bonded to said cellulose layer.

3. As a new article of manufacture, a composite plastic sheet comprising a layer of polyvinyl acetal, a layer comprising predominantly polyvinyl alcohol integrally formed on one surface of said polyvinyl acetal layer, and a second layer comprising molecularly oriented polyvinyl alcohol bonded to said polyvinyl alcohol surface layer.

4. As a new article of manufacture, a composite plastic sheet comprising a layer of polyvinyl acetal, said layer having integrally formed on one surface thereof a layer comprising a mixture of polyvinyl acetal and polyvinyl alcohol, and a layer of molecularly oriented polyvinyl alcohol bonded to said mixed surface layer.

5. As a new article of manufacture, a composite plastic sheet comprising a plurality of layers of molecularly oriented polyvinyl alcohol bonded to a supporting layer, the direction of molecular orientation in said first named layers being substantially at right angles to each other and at angles of substantially 45° to an edge of said sheet, said supporting layer comprising a plurality of layers of substantially non-hydrophilic transparent plastic material bonded together, each of said last named layers having integrally formed on the outer surface thereof a layer comprising a mixture of the material of said layer and hydrophilic material comprising a product of hydrolysis of the material of the body of said layer, one of said polyvinyl alcohol layers being bonded to each of said mixed layers.

6. As a new article of manufacture, a composite plastic sheet comprising a plurality of layers of molecularly oriented polyvinyl alcohol bonded to a supporting layer, the direction of molecular orientation in said first named layers being substantially at right angles to each other and at angles of substantially 45° to an edge of said sheet, said supporting layer comprising a plurality of layers comprising material from the class consisting of the cellulose esters, said last named layers being bonded together and each thereof having integrally formed on the outer surface thereof a layer comprising a mixture of said ester and cellulose, one of said polyvinyl alcohol layers being bonded to each of said mixed layers.

7. As a new article of manufacture, a composite plastic sheet comprising a relatively thin layer of molecularly oriented polyvinyl alcohol bonded to a substantially thicker layer comprising a cellulose ester, said second-named layer having on the surface thereof adjacent said first-named layer an integrally formed layer comprising a mixture of the material of said second-named layer and cellulose, predetermined areas of said polyvinyl alcohol layer having dichroic material incorporated therein, said areas forming in combination a predetermined design.

8. As a new article of manufacture, a composite plastic sheet comprising a plurality of layers of molecularly oriented polyvinyl alcohol bonded to a supporting layer, the direction of molecular orientation in said first named layers being substantially at right angles to each other and at angles of substantially 45° to an edge of said sheet, said supporting layer comprising a plurality of layers of substantially non-hydrophilic transparent plastic material bonded together, each of said last named layers having integrally formed on the outer surface thereof a layer comprising a mixture of the material of said layer and hydrophilic material comprising a product of hydrolysis of the material of the body of said layer, one of said polyvinyl alcohol layers being bonded to each of said mixed layers, predetermined areas of each of said polyvinyl alcohol layers having dichroic material incorporated therein, the dichroic areas in each of said sheets forming in combination a predetermined image, said images being respectively left-eye and right-eye images of a predetermined stereoscopic pair.

9. A composite light-polarizing sheet comprising a layer of molecularly oriented polyvinyl alcohol having dichroic material incorporated therein and adapted to polarize transmitted light, said layer being bonded between two layers comprising transparent plastic material consisting of a cellulose ester, each of said last-named layers having on the surface adjacent said first-named layer an integrally formed layer comprising a mixture of the material thereof and cellulose.

10. A composite light-polarizing sheet comprising a layer of molecularly oriented polyvinyl alcohol having dichroic material incorporated therein and adapted to polarize transmitted light, said layer being bonded between two layers comprising transparent plastic material consisting of a cellulose ester, each of said last named layers having a hard, optically smooth outer surface comprising a relatively hard, polymerized transparent organic plastic incorporated with said layer, each of said last-named layers having on the inner surface thereof an integrally formed layer comprising a mixture of the material thereof and cellulose.

11. A composite light-polarizing sheet comprising a layer of molecularly oriented polyvinyl alcohol having dichroic material incorporated therein and adapted to polarize transmitted light, said layer being bonded between two layers comprising transparent plastic material consisting of a cellulose ester, each of said last named layers having incorporated therewith a relatively hard, transparent methacrylic resin polymerized in situ to form an outer optically smooth surface thereon, each of said last-named layers having on the inner surface thereof an integrally formed layer comprising a mixture of the material thereof and cellulose.

12. A composite light-polarizing sheet comprising in combination a plurality of sheets of transparent plastic material comprising a cellulose ester, each of said sheets having integrally formed on one surface thereof a layer comprising a mixture of said ester and cellulose, each of said sheets having bonded to said mixed layer a sheet of molecularly oriented polyvinyl alcohol having dichroic material incorporated therein and adapted to polarize transmitted light, said composite sheets being bonded together with said polyvinyl alcohol layers in face to face relation and with the transmission axes thereof substantially parallel.

13. A composite light-polarizing sheet comprising in combination a plurality of sheets of transparent plastic material chosen from the class consisting of the cellulose esters, each of said sheets having integrally formed on one surface thereof a layer comprising a mixture of said ester and cellulose, each of said sheets having bonded to said mixed layer a sheet of molecularly oriented polyvinyl alcohol having dichroic material incorporated therein and adapted to polarize transmitted light, said composite sheets being bonded together with said polyvinyl alcohol layers in face to face relation and with the transmission axes thereof substantially parallel, the outer layer of each said composite sheet having incorporated therewith a relatively hard, transparent organic plastic polymerized in situ to form an optically smooth surface thereon.

14. The process comprising stretching a plurality of relatively thin sheets of polyvinyl alcohol to orient the molecules therein, regenerating to cellulose a layer on one surface of a plurality of sheets comprising a cellulose ester, bonding each of said polyvinyl alcohol sheets to said regenerated surface of one of said second named sheets, and bonding together a pair of the resulting composite sheets with said polyvinyl alcohol layers outermost and with the directions of molecular orientation in said polyvinyl alcohol layers substantially at right angles to each other.

EDWIN H. LAND.
JOSEPH MAHLER.
WILLIAM H. RYAN.

REFERENCES CITED

The following references are of record in the file of this patent:

UNITED STATES PATENTS

| Number | Name | Date |
| --- | --- | --- |
| 2,280,055 | Andersen | Apr. 21, 1942 |
| 2,280,482 | Dreyfus | Apr. 21, 1942 |
| 2,237,567 | Land | Apr. 8, 1941 |
| 2,063,078 | Barrett | Dec. 8, 1936 |
| 1,922,767 | Humphner | Aug. 15, 1933 |
| 1,768,795 | Sheppard et al. | July 1, 1930 |
| 2,289,715 | Land | July 14, 1942 |
| 2,061,678 | Scott | Nov. 24, 1936 |
| 2,075,106 | Fordyce | Mar. 30, 1937 |
| 2,173,304 | Land et al. | Sept. 19, 1939 |
| 2,284,590 | Rogers | May 26, 1942 |
| 2,185,018 | Sauer | Dec. 26, 1939 |
| 1,808,998 | Sheppard et al. | June 9, 1931 |
| 2,125,374 | Herrmann | Aug. 2, 1938 |
| 2,263,249 | Rogers | Nov. 18, 1941 |
| 2,158,130 | Land | May 16, 1939 |
| 2,130,212 | Watkins | Sept. 13, 1938 |
| 2,276,151 | Brandenberger | Mar. 10, 1942 |
| 2,184,999 | Land | Dec. 26, 1939 |
| 2,233,941 | Fix | Mar. 4, 1941 |
| 2,320,533 | Muskat | June 1, 1943 |

FOREIGN PATENTS

| Number | Country | Date |
| --- | --- | --- |
| 494,929 | Great Britain | Nov. 3, 1938 |